United States Patent
Tezuka

(10) Patent No.: US 10,717,161 B2
(45) Date of Patent: Jul. 21, 2020

(54) ROTATING AXIS SUPPORTING DEVICE

(71) Applicant: FANUC Corporation, Yamanashi (JP)

(72) Inventor: Hiroki Tezuka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/343,068

(22) Filed: Nov. 3, 2016

(65) Prior Publication Data

US 2017/0120405 A1 May 4, 2017

(30) Foreign Application Priority Data

Nov. 4, 2015 (JP) .................................. 2015-216397

(51) Int. Cl.
*B23Q 1/52* (2006.01)
*B23Q 3/18* (2006.01)
*B23Q 16/02* (2006.01)

(52) U.S. Cl.
CPC ............. *B23Q 1/525* (2013.01); *B23Q 3/186* (2013.01); *B23Q 16/02* (2013.01); *B23Q 2220/004* (2013.01)

(58) Field of Classification Search
CPC . B23Q 1/525; B23Q 1/52; B23Q 1/26; B23Q 1/28; B23Q 1/50; B23Q 16/00
See application file for complete search history.

(56) References Cited

U.S. PATENT DOCUMENTS

| | | | | |
|---|---|---|---|---|
| 3,517,624 A | * | 6/1970 | Helms | B23Q 1/621 108/102 |
| 3,700,228 A | * | 10/1972 | Peale | B23Q 1/5437 269/61 |
| 4,575,942 A | * | 3/1986 | Moriyama | B23Q 1/34 257/E21.211 |
| 4,661,678 A | * | 4/1987 | Wavre | B23D 57/0046 204/206 |
| 4,729,536 A | * | 3/1988 | Scala | B23Q 1/621 108/143 |

(Continued)

FOREIGN PATENT DOCUMENTS

| | | |
|---|---|---|
| CH | 701326 A1 | 12/2010 |
| EP | 2311600 A1 | 4/2011 |

(Continued)

OTHER PUBLICATIONS

Office Action in JP Application No. 2015-216397, dated Mar. 13, 2018, 8pp.

(Continued)

*Primary Examiner* — Orlando E Aviles
*Assistant Examiner* — Seahee Yoon
(74) *Attorney, Agent, or Firm* — Hauptman Ham, LLP

(57) ABSTRACT

A rotating axis supporting device of the present invention includes: a housing; a rotating axis rotatably pivoted to the housing; a case for fixing the housing; and an adjustment mechanism adjusting a position of the rotating axis by causing an attachment surface of the housing attached to the case to be perpendicular to an axial direction of the rotating axis, attaching the housing to move relative to the case in parallel to the attachment surface, and moving the housing and the case relative to each other in parallel to the attachment surface.

5 Claims, 11 Drawing Sheets

(56) References Cited

U.S. PATENT DOCUMENTS

| | | | | |
|---|---|---|---|---|
| 4,896,869 A * | 1/1990 | Takekoshi | ............... | B23P 19/04 |
| | | | | 269/309 |
| 5,018,617 A * | 5/1991 | Miyata | ................. | B23Q 7/1431 |
| | | | | 198/346.1 |
| 5,075,527 A * | 12/1991 | Ikuma | ................... | B23K 37/053 |
| | | | | 219/125.11 |
| 5,139,245 A * | 8/1992 | Bruns | ................... | B23Q 1/035 |
| | | | | 269/21 |
| 5,741,111 A * | 4/1998 | Goostrey | ............ | B23Q 1/5456 |
| | | | | 269/126 |
| 6,332,604 B1 * | 12/2001 | Chu | ........................ | B23Q 1/28 |
| | | | | 269/27 |
| 6,865,788 B2 * | 3/2005 | Pasquetto | ............ | B23Q 1/5437 |
| | | | | 269/57 |
| 8,523,500 B2 * | 9/2013 | Yamaura | ................ | B23Q 1/623 |
| | | | | 29/33 P |
| 8,857,779 B2 * | 10/2014 | Hornqvist | ................ | G01J 3/02 |
| | | | | 248/181.1 |
| 9,212,887 B2 * | 12/2015 | Yamane | ................ | G01B 5/004 |
| 9,327,374 B1 * | 5/2016 | McCulloch | ........... | B23Q 1/525 |
| 9,919,393 B2 * | 3/2018 | Shirone | ................ | B23Q 3/063 |
| 2003/0129035 A1 * | 7/2003 | Schworer | ................ | B23Q 1/52 |
| | | | | 409/168 |
| 2004/0047701 A1 * | 3/2004 | Chen | ....................... | B23Q 1/30 |
| | | | | 409/221 |
| 2006/0185453 A1 * | 8/2006 | Miyazawa | ............... | B23Q 1/52 |
| | | | | 74/49 |
| 2006/0267262 A1 * | 11/2006 | Schiavi | ................. | B23Q 1/035 |
| | | | | 269/21 |
| 2008/0175684 A1 * | 7/2008 | Schmidt | ................ | B23Q 1/012 |
| | | | | 409/212 |
| 2011/0040523 A1 * | 2/2011 | Matsushita | ............ | B23Q 17/22 |
| | | | | 702/152 |
| 2012/0011964 A1 * | 1/2012 | Tatsuda | .................. | B23Q 1/525 |
| | | | | 74/813 R |
| 2012/0013963 A1 * | 1/2012 | Hornqvist | ................. | G01J 3/02 |
| | | | | 359/15 |
| 2013/0174420 A1 * | 7/2013 | Chacon | .................. | B23Q 3/063 |
| | | | | 29/889.7 |
| 2014/0239568 A1 * | 8/2014 | Masuya | ................... | B23Q 1/26 |
| | | | | 269/57 |
| 2015/0139759 A1 * | 5/2015 | Lin | ...................... | B23Q 7/1431 |
| | | | | 414/222.07 |

FOREIGN PATENT DOCUMENTS

| | | |
|---|---|---|
| JP | 51-57360 A | 5/1976 |
| JP | 53-63861 U | 5/1978 |
| JP | 62-238490 A | 10/1987 |
| JP | S63-177347 U | 11/1988 |
| JP | H4-128563 U | 11/1992 |
| JP | H11-136903 A | 5/1999 |
| JP | 2002-292534 A | 10/2002 |
| JP | 2002-364625 A | 12/2002 |
| JP | 3098136 U | 2/2004 |
| JP | 2008-139414 A | 6/2006 |
| JP | 2009-58069 A | 3/2009 |
| JP | 2011-127735 A | 6/2011 |
| JP | 3183365 U | 5/2013 |
| JP | 2014-19024 A | 2/2014 |
| WO | 2010/007685 A1 | 1/2010 |

OTHER PUBLICATIONS

Office Action in JP Application No. 2015-216397, dated Oct. 24, 2017, 12 pp.

Office Action in JP Application No. 2015-216397, dated Jul. 3, 2018, 13pp.

Office Action in DE Application No. 102016120704.7, dated Aug. 19, 2019, 6pp.

* cited by examiner

SIDE VIEW OF CRADLE TYPE ROTARY TABLE

TOP VIEW OF CRADLE TYPE ROTARY TABLE

ROTATING AXIS SUPPORTING DEVICE

RELATED APPLICATIONS

The present application claims priority to Japanese Patent Application Number 2015-216397, filed Nov. 4, 2015, the disclosure of which is hereby incorporated by reference herein in its entirety.

BACKGROUND OF THE INVENTION

1. Field of the Invention

The present invention relates to a rotating axis supporting device provided with a cradle type rotary table which is placed on a machine tool.

2. Description of the Related Art

As a rotary table, there is a case in which a rotary driving device is used singly, and there is a "cradle type" rotary table in which a jig plate is rotated by a rotary driving device and a rotating axis supporting device. FIG. 9 is an example of a configuration of a cradle type rotary table. A cradle type rotary table 1 includes a jig plate 40 on which a workpiece 50 to be machined is installed, a rotary driving device 10 which rotates the jig plate 40, a rotating axis supporting device 20 which is provided at a position opposing the rotary driving device 10 and supports the jig plate 40, and a base plate 41 on which both the rotary driving device 10 and the rotating axis supporting device 20 are placed. The jig plate 40 has one end supported by a bracket 11 provided in the rotary driving device 10 and has the other end supported by a bracket 23 provided in the rotating axis supporting device 20. In addition, in the rotating axis supporting device 20, a housing 22 provided with a bearing for a rotating axis 24 is attached to a case 21.

In the cradle type rotary table 1 having the configuration illustrated in FIG. 9, when the rotary driving device 10 rotates the bracket 11 about a rotation center 13 of a rotating axis 12, due to the rotation, the jig plate 40 having one end supported by the bracket 11 is rotated, and the bracket 23 that supports the other end of the jig plate 40 is rotated about a rotation center 25 of the rotating axis 24 of the rotating axis supporting device 20. Therefore, in order to cause smoothly rotate the workpiece 50 to be machined, which is placed on the jig plate 40 having the end portions supported by the brackets 11 and 23, as illustrated in FIG. 10A, the positions in a height direction of the rotation center 13 of the rotary driving device 10 and the rotation center 25 of the rotating axis supporting device 20 need to be adjusted to be coincident with each other. In addition, as illustrated in FIG. 10B, the positions in a depth direction of the rotation center 13 of the rotary driving device 10 and the rotation center 25 of the rotating axis supporting device 20 need to be adjusted to be coincident with each other. Furthermore, for the smooth rotation, the axial direction of the rotation center 13 and the axial direction of the rotation center 25 need to be coincident with each other. Therefore, as illustrated in FIGS. 11A and 11B, the inclinations in the height direction and the inclinations in the depth direction of the rotation centers need to be adjusted.

In a case where the positions and axial directions of the rotation center 13 of the rotary driving device 10 and the rotation center 25 of the rotating axis supporting device 20 are not adjusted to be coincident with each other, when the jig plate 40 is rotated, a strain occurs in the jig plate 40 due to the discordance between the rotation centers 13 and 25, resulting in deterioration in components such as a bearing.

As a related art in which the rotation center 13 of the rotary driving device 10 and the rotation center 25 of the rotating axis supporting device 20 are adjusted in the height direction, for example, Japanese Registered Utility Model No. 3183365 discloses, as illustrated in FIG. 12, a technique in which spacers 42 and 43 for height direction adjustment are produced to cope with the height difference between the rotation centers 13 and 25, and by installing the spacers 42 and 43 under the rotary driving device 10 or the rotating axis supporting device 20, the rotation center 13 of the rotary driving device 10 and the rotation center 25 of the rotating axis supporting device 20 are adjusted in the height direction. In addition, as illustrated in FIG. 13, an additional machining may also be performed on the base plate 41, on which the rotary driving device 10 and the rotating axis supporting device 20 are provided, according to the height difference between the rotation center 13 of the rotary driving device 10 and the rotation center 25 of the rotating axis supporting device 20 for adjustment.

On the other hand, for adjustment in the depth direction of the rotation center 13 of the rotary driving device 10 and the rotation center 25 of the rotating axis supporting device 20, the entirety of the rotary driving device 10 or the rotating axis supporting device 20 is caused to slide in the depth direction to cope with the adjustment.

However, in the method disclosed in Japanese Registered Utility Model No. 3183365 in which the spacers 42 and 43 corresponding to the height difference between the rotation centers 13 and 25 are used for the adjustment in the height direction, the height of the rotation center 13 of the rotary driving device 10 and the height of the rotation center 25 of the rotating axis supporting device 20 need to be measured and the spacers 42 and 43 need to be produced according to the height difference therebetween. In addition, in the method of performing an additional machining on the base plate 41, similarly, the height of the rotation center 13 of the rotary driving device 10 and the height of the rotation center 25 of the rotating axis supporting device 20 need to be measured and the additional machining of the base plate 41 according to the height difference therebetween is necessary. Therefore, even in either method, there is a problem that a corresponding number of processes to the adjustment are necessary.

In addition, in the adjustment method described above, it is difficult to accurately move the rotary driving device 10 and the rotating axis supporting device 20 in parallel. Therefore, the adjusted inclinations in the axial directions of the rotation centers 13 and 25, which have already been adjusted, may be deviated in a case of performing adjustment of the rotation centers 13 and 25 in the height direction and the depth direction, and the inclinations of the axial directions thereof need to be re-adjusted. Accordingly, there is a problem that the number of processes for the adjustment also increases.

SUMMARY OF THE INVENTION

The invention provides a rotating axis supporting device capable of adjusting the position of a rotation center of a rotating axis without the production of a spacer, an additional machining of a base plate, and an effect on the inclination of the rotation center.

According to the invention, a rotating axis supporting device includes: a housing; a rotating axis including an elongated member rotatably pivoted to the housing; a case for fixing the housing; and an adjustment mechanism adjusting a position of the rotating axis by causing an attachment surface of the housing attached to the case to be perpendicular to an axial direction of the rotating axis, attaching the housing to move relative to the case in parallel to the attachment surface, and moving the housing and the case relative to each other in parallel to the attachment surface. In the rotating axis supporting device, a bolt may be disposed as the adjustment mechanism in the case, and the position of the rotating axis may be adjusted by moving the housing and the case relative to each other in parallel to the attachment surface by fastening or loosening the bolt.

The rotating axis supporting device may further include an elastic body provided on a side opposing the bolt in the case.

In addition, according to the invention, a rotary table includes: a jig plate having a workpiece installed thereon; a rotary driving device rotating the jig plate; the rotating axis supporting device provided at a position opposing the rotary driving device to support the jig plate; and a base plate having the rotary driving device and the rotating axis supporting device placed thereon.

According to the invention, regarding adjustment in the height direction of the rotation center of the rotating axis supporting device in the cradle type rotary table, there is no need to add a spacer for height direction adjustment or there is no need to perform an additional machining of a base plate. Therefore, there is no need to increase the number of processes for adjustment. In addition, adjustment of the rotation center in the height and depth directions is possible without affecting the inclination of the rotation center.

BRIEF DESCRIPTION OF THE DRAWINGS

The above and other objects and features of the invention will be more apparent from the following detailed description taken in conjunction with the accompanying drawings in which.

DETAILED DESCRIPTION OF THE PREFERRED EMBODIMENTS

Figure 1:
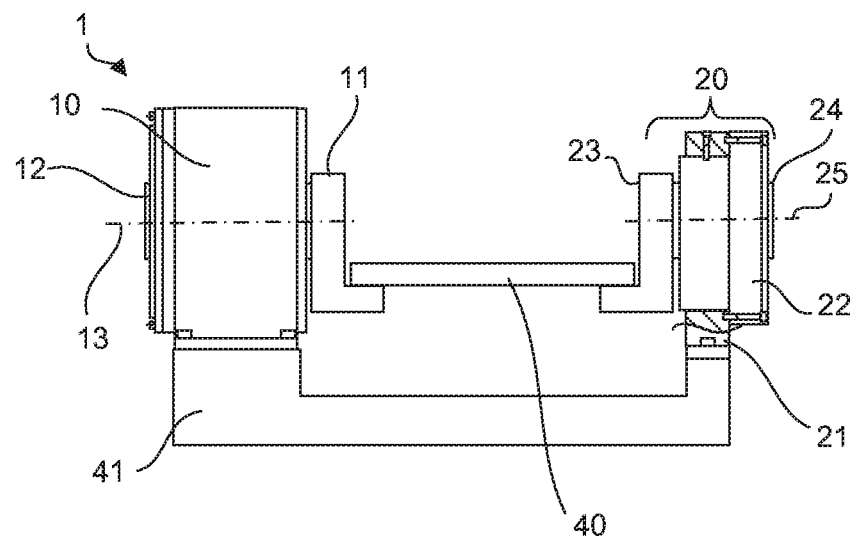
FIG. 1 is a side view of a cradle type rotary table according to a first embodiment of the invention.

Hereinafter, embodiments of the invention will be described with reference to the drawings. Like elements which are the same or similar to those of the related art are denoted by like reference numerals in the description.

FIG. 1 is a side view of a cradle type rotary table provided with a rotating axis supporting device according to a first embodiment of the invention. In FIG. 1, a sectional view of portions of the periphery of a case is illustrated to cause the inside of the rotating axis supporting device to be recognized. A cradle type rotary table 1 illustrated in FIG. 1 is configured such that a rotary driving device 10 and a rotating axis supporting device 20 of the embodiment of the invention are disposed on a base plate 41. The rotating axis supporting device 20 of this embodiment is constituted by a case 21 and a housing 22 which rotatably supports a rotating axis 24 via a bearing. The case 21 is fixed onto the upper surface of the base plate 41, and the housing 22 is attached to the case 21. In addition, a bracket 11 and a bracket 23 are respectively fixed to the rotary driving device 10 and the rotating axis supporting device 20. A jig plate 40 is installed on the brackets 11 and 23. A workpiece to be machined is installed on the jig plate 40, and the workpiece is subjected to indexing at a desired angle by the rotary driving device 10.

Figure 2:
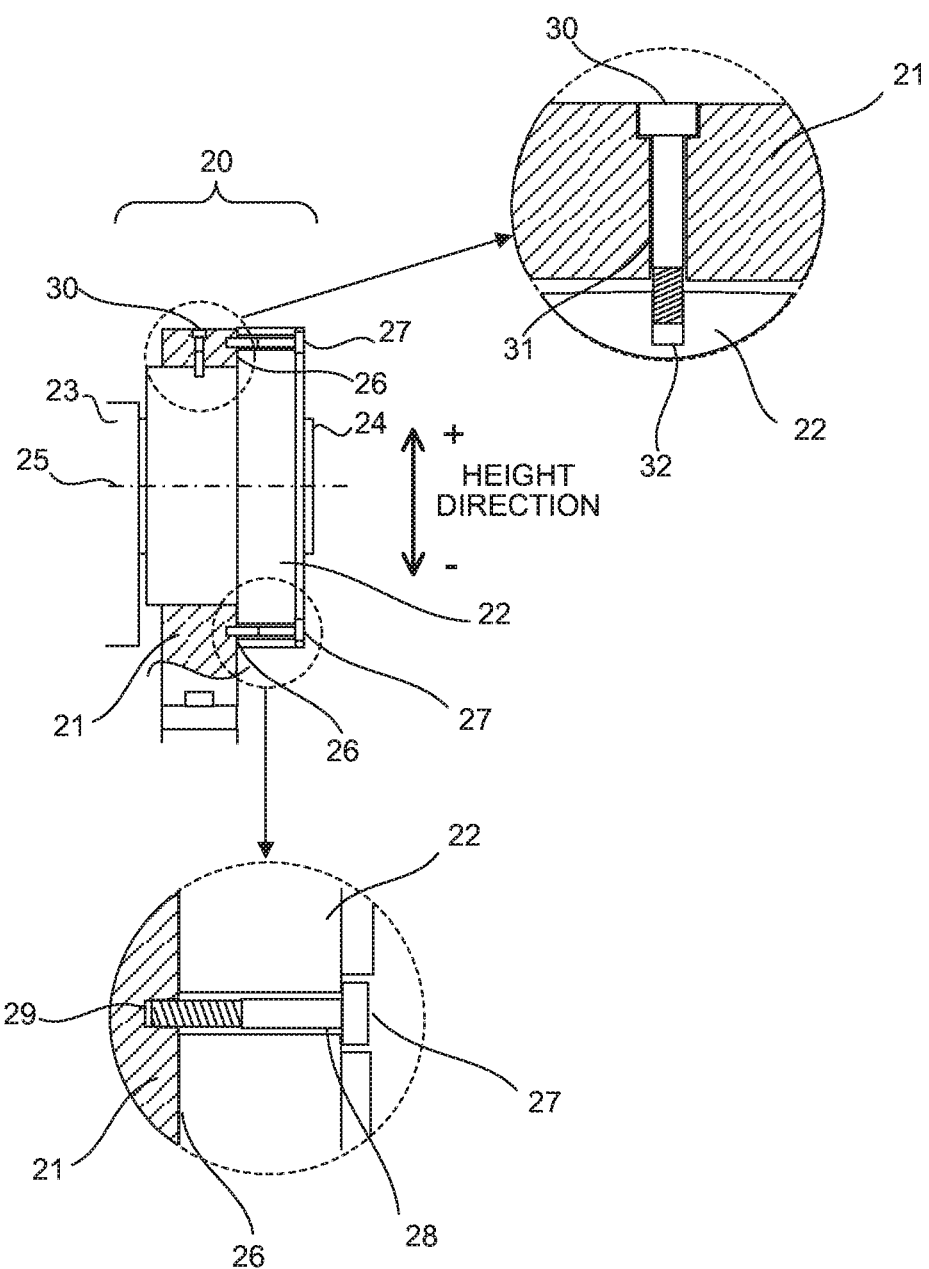
FIG. 2 is an enlarged view of the periphery of a rotating axis supporting device in FIG. 1.

FIG. 2 is an enlarged view of the periphery of the rotating axis supporting device 20 of the cradle type rotary table 1 illustrated in FIG. 1. In FIG. 2, a sectional view of portions of the periphery of the case 21 is illustrated to cause the inside of the rotating axis supporting device 20 to be recognized. In the rotating axis supporting device 20 of this embodiment, an attachment surface 26 of the housing 22 attached to the case 21 is perpendicular to the axial direction of the rotating axis 24.

As illustrated in the figures, a plurality of insertion holes 28 having hole diameters slightly greater than the bolt diameters of fixing bolts 27 are provided in the housing 22. In addition, in the case 21, threaded holes 29 are provided at positions which correspond to the insertion holes 28 when the housing 22 is attached thereto. By respectively inserting the fixing bolts 27 into the insertion holes 28 and firmly screwing the fixing bolts 27 into the threaded holes 29 of the case 21, the housing 22 is pressed against and fixed to the case 21 by the head portions of the fixing bolts 27. In addition, by causing the fixing bolts 27 to be in a slightly loosened and temporarily fixed state, the housing 22 can be moved relative to the case 21 by the gap between the fixing bolt 27 and the insertion hole 28 in directions parallel to the attachment surface 26 (for example, a height direction and a depth direction) while the housing 22 is attached to the case 21. In addition, although only two fixing bolts 27 are illustrated in FIG. 2, a sufficient number of fixing bolts 27 to obtain a pressing force to fix the housing 22 to the case 21 may be used.

On the other hand, in the case 21, a height direction adjustment insertion hole 31 into which a height direction adjustment bolt 30 can be inserted is provided. In addition, in the housing 22, a height direction adjustment threaded hole 32 is provided at a position which corresponds to the height direction adjustment insertion hole 31 when attached to the case 21. By inserting the height direction adjustment bolt 30 into the height direction adjustment insertion hole 31, screwing the height direction adjustment bolt 30 into the height direction adjustment threaded hole 32, and changing the screwing amount, the positional relationship between the case 21 and the housing 22 in the height direction can be adjusted. These configurations function as an adjustment mechanism which adjusts the position of a rotation center 25 in the height direction in this embodiment.

Figure 3:
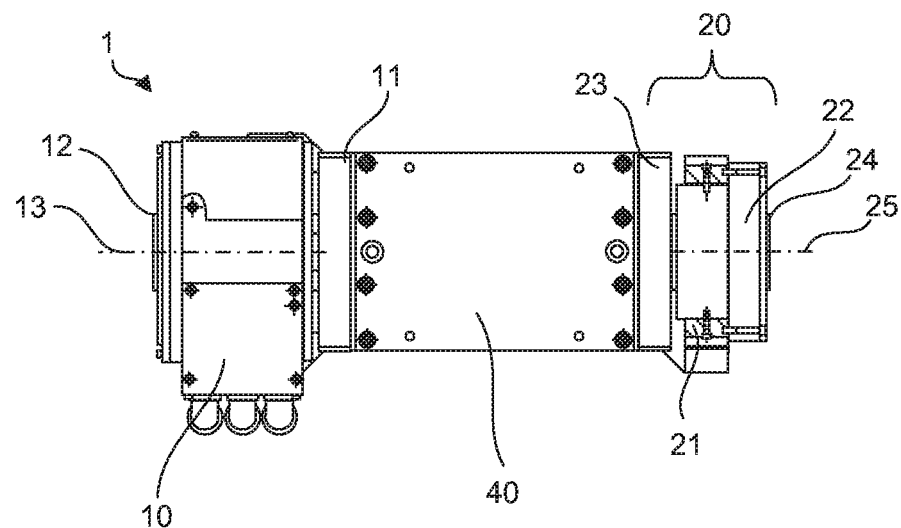
FIG. 3 is a top view of the cradle type rotary table according to the first embodiment of the invention.
Figure 4:
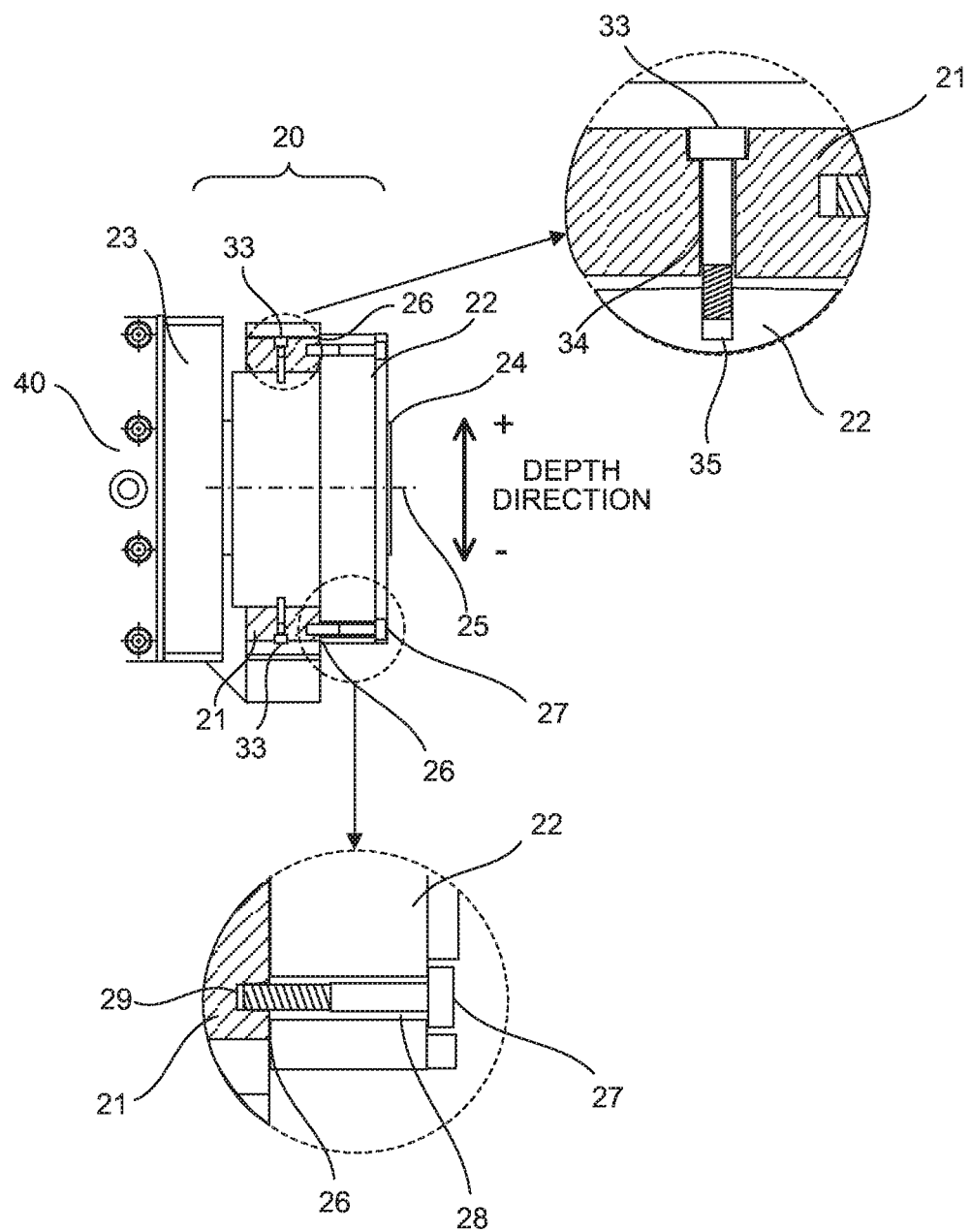
FIG. 4 is an enlarged view of the periphery of the rotating axis supporting device in FIG. 3.

FIG. 3 is a top view of the cradle type rotary table provided with the rotating axis supporting device 20 according to this embodiment illustrated in FIG. 1, and FIG. 4 is an enlarged view of the periphery of the rotating axis supporting device 20 of the cradle type rotary table 1 illustrated in FIG. 3. In FIGS. 3 and 4, sectional views of portions of the periphery of the case are illustrated to cause the inside of the rotating axis supporting device to be recognized.

As illustrated in FIG. 4, in the case 21, a depth direction adjustment insertion hole 34 into which a depth direction adjustment bolt 33 can be inserted is provided. In addition, in the housing 22, a depth direction adjustment threaded hole 35 is provided at a position which corresponds to the depth direction adjustment insertion hole 34 when attached to the case 21. By inserting the depth direction adjustment bolt 33 into the depth direction adjustment insertion hole 34, screwing the depth direction adjustment bolt 33 into the depth direction adjustment threaded hole 35, and changing the screwing amount, the positional relationship between the case 21 and the housing 22 in the depth direction can be adjusted. Although two depth direction adjustment bolts 33 are illustrated in FIG. 4, the configuration of the periphery of the depth direction adjustment bolt 33 on the lower side is the same as that of the depth direction adjustment bolt 33 on the upper side. These configurations function as an adjustment mechanism which adjusts the position of the rotation center 25 in the depth direction in this embodiment.

In the rotating axis supporting device 20 of this embodiment having the above-described configurations, adjustment of the rotation center 25 in the height direction is performed in the following order.

[Procedure 1] The inclination of the axial direction of a rotation center 13 of a rotating axis 12 of the rotary driving device 10 and the inclination of the axial direction of rotation center 25 of the rotating axis 24 of the rotating axis supporting device 20 in both the height direction and the depth direction are adjusted in advance.

[Procedure 2] In order to cause the position in the height direction of the rotation center 13 of the rotating axis 12 of the rotary driving device 10 and the position in the height direction of the rotation center 25 of the rotating axis 24 of the rotating axis supporting device 20 to be coincident with each other, the fixing bolts 27 for fixing the housing 22 of the rotating axis supporting device 20 to the case 21 are caused to be in a loosened and temporarily fixed state.

[Procedure 3] In a case of increasing the rotation center 25 of the rotating axis 24 of the rotating axis supporting device 20 in height, the height direction adjustment bolt 30 is fastened. Contrary to this, in a case of a decrease in height, the height direction adjustment bolt 30 is loosened.

[Procedure 4] After the adjustment, the fixing bolts 27 are finally fastened to fix the housing 22 to the case 21.

In addition, adjustment in the depth direction of the rotation center 25 in the rotating axis supporting device 20 of this embodiment is performed in the following order.

[Procedure 5] In order to cause the position in the depth direction of the rotation center 13 of the rotating axis 12 of the rotary driving device 10 and the position in the depth direction of the rotation center 25 of the rotating axis 24 of the rotating axis supporting device 20 to be coincident with each other, the fixing bolts 27 for fixing the housing 22 of the rotating axis supporting device 20 to the case 21 are caused to be in a loosened and temporarily fixed state

[Procedure 6] When the rotation center 25 of the rotating axis 24 of the rotating axis supporting device 20 is moved in the + direction of the depth direction, the depth direction adjustment bolt 33 on the − direction side is loosened, and the depth direction adjustment bolt 33 on the + direction side is fastened. Contrary, for movement in the − direction, the depth direction adjustment bolt 33 on the + direction side is loosened, and the depth direction adjustment bolt 33 on the − direction side is fastened.

[Procedure 7] After the adjustment, the fixing bolts 27 are finally fastened to fix the housing 22 to the case 21.

As described above, according to the structure of the invention, the housing can be simply moved by the height direction adjustment bolt. Therefore, there is no need to provide a spacer for height adjustment, and there is no need to perform an additional machining on the base plate. In addition, since the housing can be moved in parallel to the height direction, adjustment of the rotation center in the height direction is possible while maintaining the inclination of the rotation center.

In addition, according to the structure of the invention, adjustment of the rotation center in the depth direction is also possible while maintaining the inclination of the rotation center.

Figure 5:
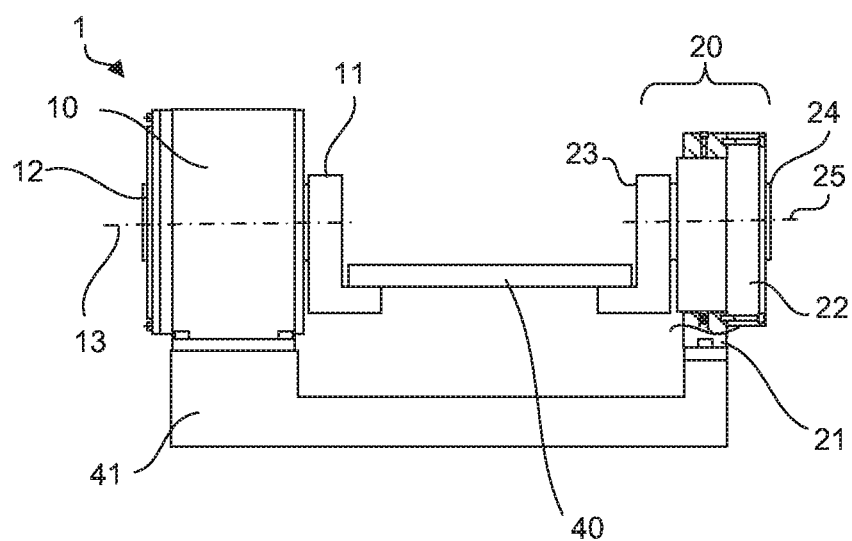
FIG. 5 is a side view of a cradle type rotary table according to a second embodiment of the invention.
Figure 6:
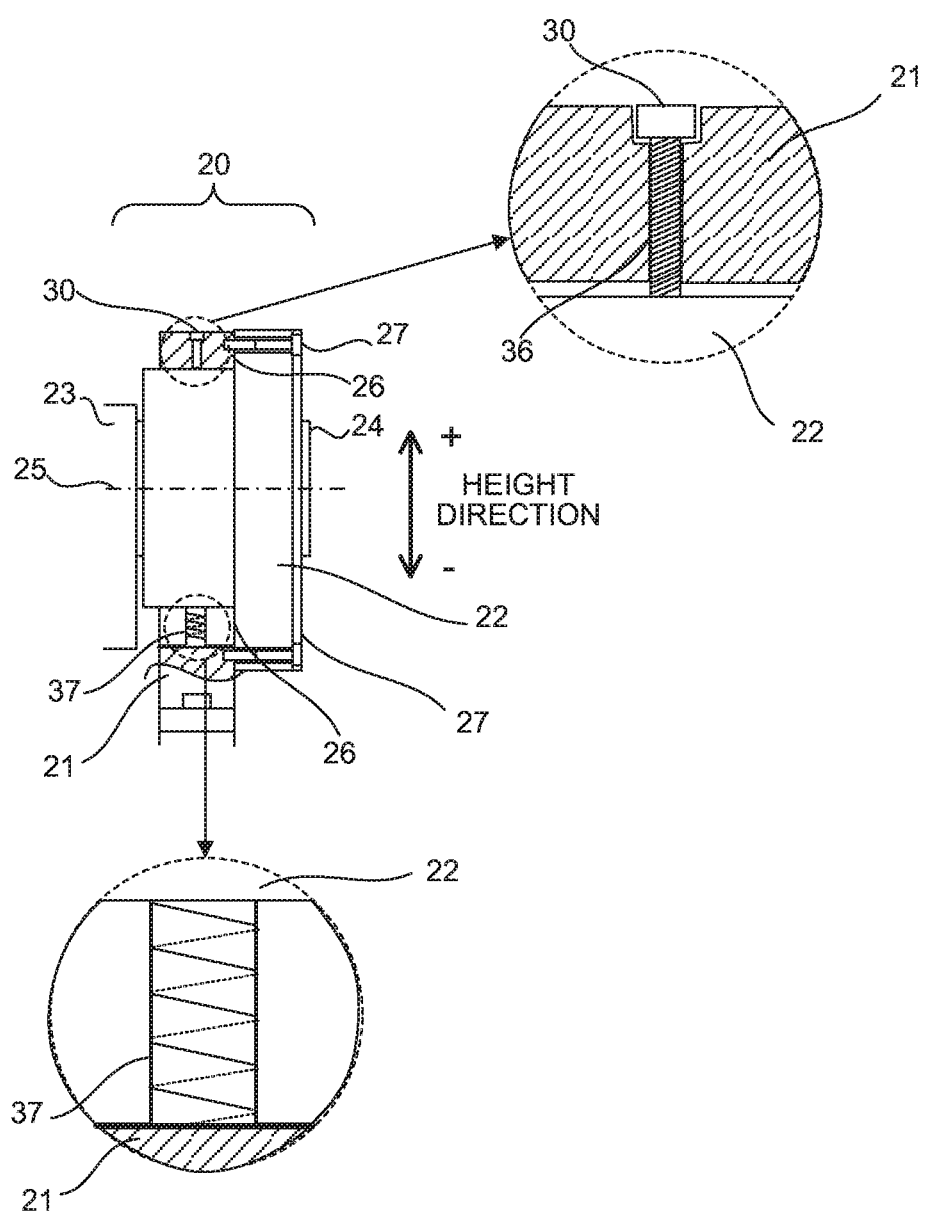
FIG. 6 is an enlarged view of the periphery of a rotating axis supporting device in FIG. 5.

FIG. 5 is a side view of a cradle type rotary table provided with a rotating axis supporting device 20 according to a second embodiment of the invention, and FIG. 6 is an enlarged view of the periphery of the rotating axis supporting device 20 of a cradle type rotary table 1 illustrated in FIG. 5. In FIGS. 5 and 6, sectional views of portions of the periphery of a case are illustrated to cause the inside of the rotating axis supporting device to be recognized. The rotating axis supporting device 20 of this embodiment is different from that of the first embodiment in that an elastic body is introduced into an adjustment mechanism which adjusts the position of a rotation center 25 in a depth direction and the position thereof in a depth direction.

As in the first embodiment, a housing 22 of this embodiment is fixed to a case 21 by fixing bolts 27. In addition, by causing the fixing bolts 27 to be in a slightly loosened and temporarily fixed state, the housing 22 can be moved relative to the case 21 in directions parallel to an attachment surface 26 while the housing 22 is attached to the case 21.

In addition, in the case 21 of this embodiment, a height direction adjustment threaded hole 36 which is threaded on the inner wall is provided. By screwing a height direction adjustment bolt 30 into the height direction adjustment threaded hole 36, an end portion of the height direction adjustment bolt 30 protrudes from the inner portion of the case 21, and by changing the screwing amount, the housing 22 can be pressed downward in the − direction of the height direction.

On the other hand, a height direction adjustment elastic body 37 formed as a spring or the like is disposed at a position that opposes the height direction adjustment bolt 30 with the housing 22 interposed therebetween, and the housing 22 can be pressed upward in the + direction of the height direction by the elastic force.

Figure 7:
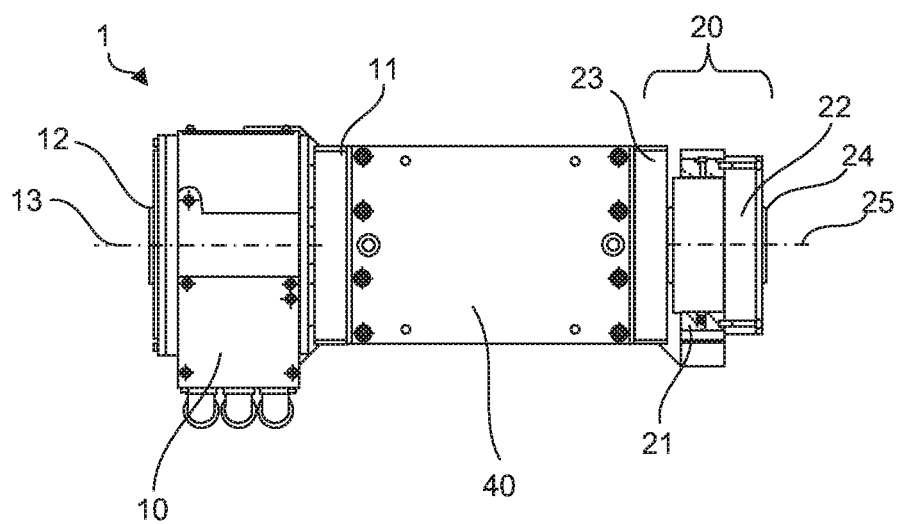
FIG. 7 is a top view of the cradle type rotary table according to the second embodiment of the invention.
Figure 8:
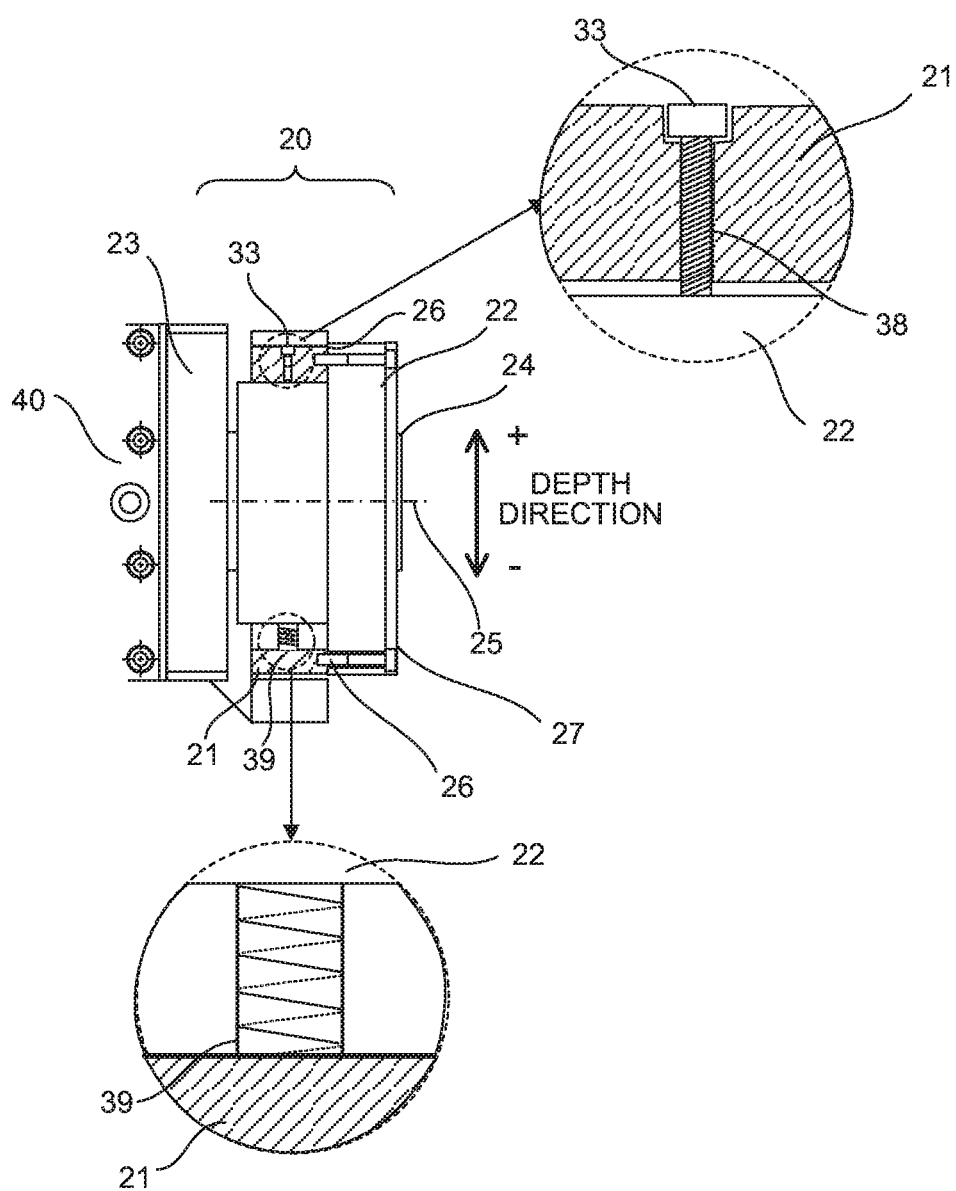
FIG. 8 is an enlarged view of the periphery of the rotating axis supporting device in FIG. 7.
Figure 9:
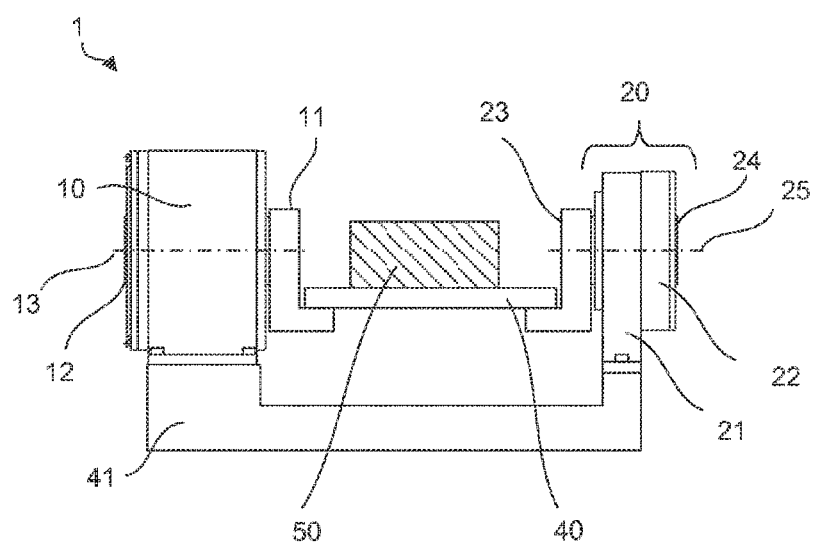
FIG. 9 is a side view of a cradle type rotary table according to the related art.
Figure 10A:
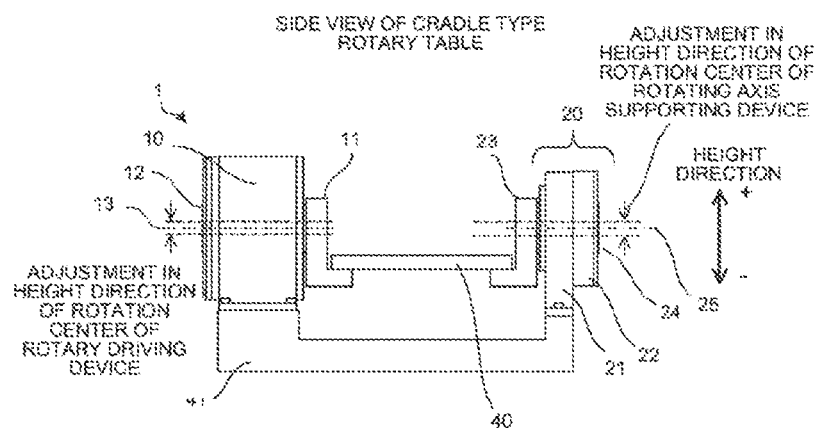
FIG. 10A is a side view of the cradle type rotary table, illustrating adjustment of the positions of rotating axes in a height direction in the cradle type rotary table.
Figure 10B:
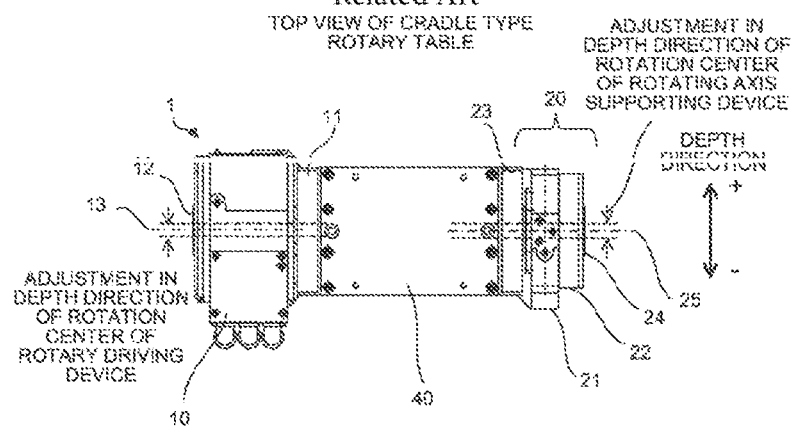
FIG. 10B is a top view of the cradle type rotary table, illustrating adjustment of the positions of the rotating axes in the depth direction in the cradle type rotary table.
Figure 11A:
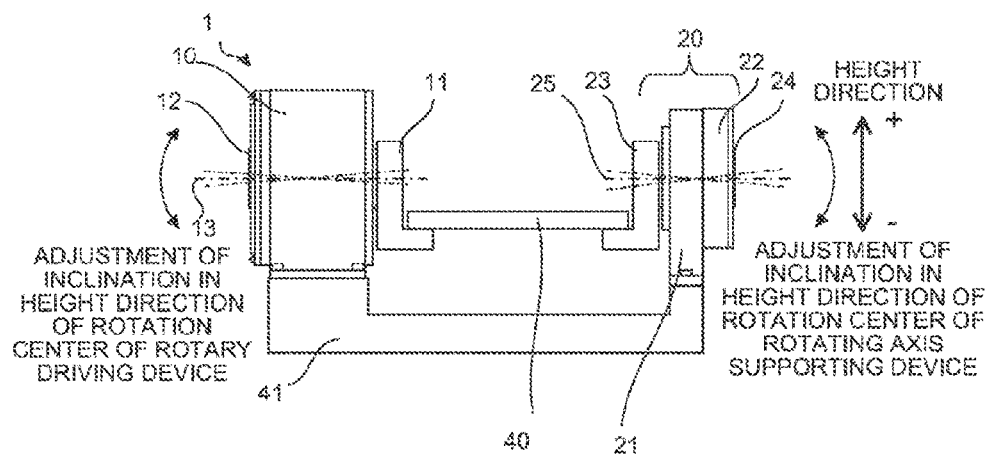
FIG. 11A is a side view of the cradle type rotary table, illustrating adjustment of the inclinations of the rotating axes in the height direction in the cradle type rotary table.
Figure 11B:
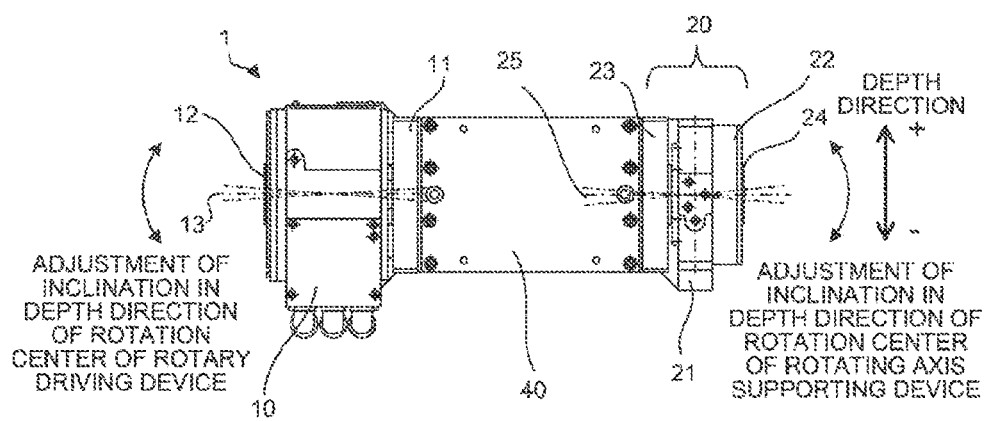
FIG. 11B is a top view of the cradle type rotary table, illustrating adjustment of the inclinations of the rotating axes in the depth direction in the cradle type rotary table.
Figure 12:
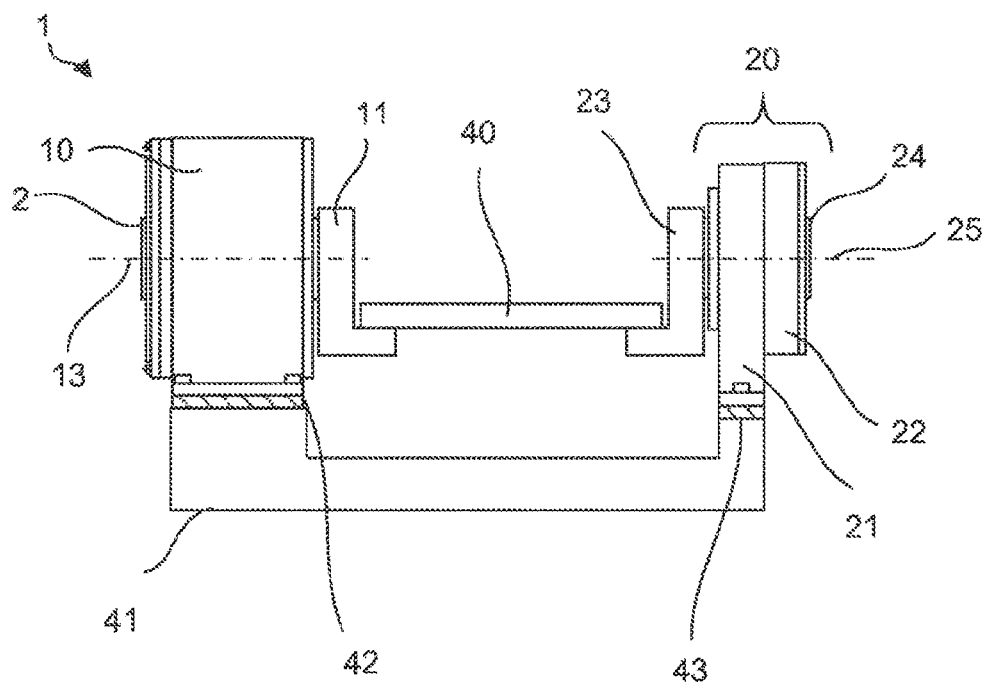
FIG. 12 is a view illustrating adjustment of the positions of rotating axes in a height direction in a cradle type rotary table which uses spacers in the related art.
Figure 13:
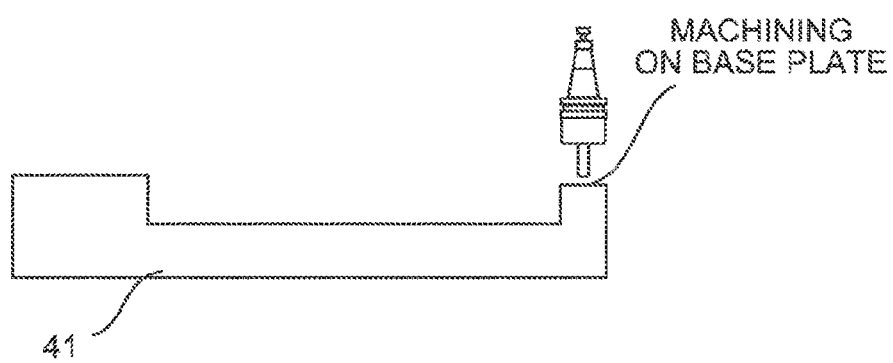
FIG. 13 is a view illustrating adjustment of the positions of rotating axes in a height direction in a cradle type rotary table through an additional machining of a base plate in the related art.

FIG. 7 is a top view of the cradle type rotary table provided with the rotating axis supporting device 20 according to this embodiment illustrated in FIG. 5, and FIG. 8 is an enlarged view of the periphery of the rotating axis supporting device 20 of the cradle type rotary table 1 illustrated in FIG. 7. In FIGS. 7 and 8, sectional views of portions of the periphery of the case 21 are illustrated to cause the inside of the rotating axis supporting device to be recognized.

As illustrated in FIG. 8, in the case 21 of this embodiment, a depth direction adjustment threaded hole 38 which is threaded on the inner wall is provided. By screwing a depth direction adjustment bolt 33 into the depth direction adjustment threaded hole 38, an end portion of the depth direction adjustment bolt 33 protrudes from the inner portion of the case 21, and by changing the screwing amount, the housing 22 can be pressed downward in the − direction of the depth direction.

On the other hand, a depth direction adjustment elastic body 39 formed as a spring or the like is disposed at a position that opposes the depth direction adjustment bolt 33 with the housing 22 interposed therebetween, and the housing 22 can always be pressed in the + direction of the depth direction by the elastic force.

In the rotating axis supporting device 20 of this embodiment having the above-described configurations, adjustment of the rotation center 25 in the height direction is performed in the following order.

[Procedure 1] The inclination of the axial direction of a rotation center 13 of a rotating axis 12 of a rotary driving device 10 and the inclination of the axial direction of rotation center 25 of a rotating axis 24 of the rotating axis supporting device 20 in both the height direction and the depth direction are adjusted in advance.

[Procedure 2] In order to cause the position in the height direction of the rotation center 13 of the rotating axis 12 of the rotary driving device 10 and the position in the height direction of the rotation center 25 of the rotating axis 24 of the rotating axis supporting device 20 to be coincident with each other, the fixing bolts 27 for fixing the housing 22 of the rotating axis supporting device 20 to the case 21 are caused to be in a loosened and temporarily fixed state.

[Procedure 3] In a case of increasing the rotation center 25 of the rotating axis 24 of the rotating axis supporting device 20 in height, the height direction adjustment bolt 30 is loosened. When the height direction adjustment bolt 30 is loosened, the housing 22 is raised by the elastic force of the height direction adjustment elastic body 37. Contrary to this, in a case of a decrease in height, the height direction adjustment bolt 30 is fastened. By fastening the height direction adjustment bolt 30, the housing 22 can be lowered against the elastic force of the height direction adjustment elastic body 37.

[Procedure 4] After the adjustment, the fixing bolts 27 are finally fastened to fix the housing 22 to the case 21.

In addition, adjustment in the depth direction of the rotation center 25 in the rotating axis supporting device 20 of this embodiment is performed in the following order.

[Procedure 5] In order to cause the position in the depth direction of the rotation center 13 of the rotating axis 12 of the rotary driving device 10 and the position in the depth direction of the rotation center 25 of the rotating axis 24 of the rotating axis supporting device 20 to be coincident with each other, the fixing bolts 27 for fixing the housing 22 of the rotating axis supporting device 20 to the case 21 are caused to be in a loosened and temporarily fixed state.

[Procedure 6] When the rotation center 25 of the rotating axis 24 of the rotating axis supporting device 20 is moved in the + direction of the depth direction, the depth direction adjustment bolt 33 is loosened. By loosening the depth direction adjustment bolt 33, the housing 22 is moved in the + direction of the depth direction by the elastic force of the depth direction adjustment elastic body 39. Contrary, for movement in the − direction, the depth direction adjustment bolt 33 is fastened.

By fastening the depth direction adjustment bolt 33, the housing 22 can be moved in the direction of the depth direction against the elastic force of the depth direction adjustment elastic body 39.

[Procedure 7] After the adjustment, the fixing bolts 27 are finally fastened to fix the housing 22 to the case 21.

As described above, according to the structure of the invention, the housing can be simply moved by the height direction adjustment bolt. Therefore, there is no need to provide a spacer for height adjustment, and there is no need to perform an additional machining on the base plate. In addition, since the housing can be moved in parallel to the height direction, adjustment of the rotation center in the height direction is possible while maintaining the inclination of the rotation center.

In addition, according to the structure of the invention, adjustment of the rotation center in the depth direction is also possible while maintaining the inclination of the rotation center.

While the embodiments of the invention have been described above, the invention is not limited only to the above-described embodiments, and can be embodied in various forms by appropriately applying modifications.

Figure 2A:
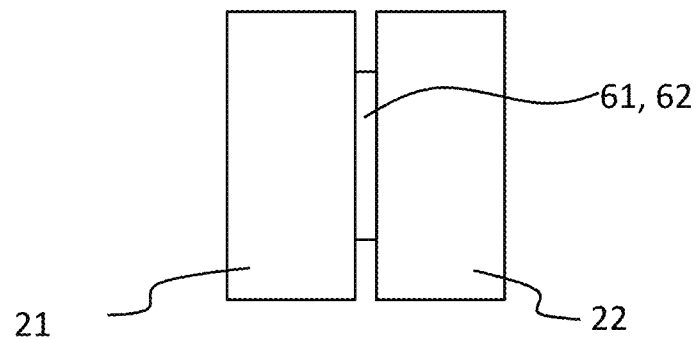
FIG. 2A is a schematic view showing an alternative embodiment.

For example, in the above-described embodiments, the fixing bolts 27 are used to fix the housing 22 to the case 21. However, for example, as shown in FIG. 2A, the housing 22 may be fixed to the case 21 by using an electromagnetic chuck 61 or a vacuum chuck 62, and in order to adjust the position of the rotation center, the housing 22 can be moved relative to the case 21 while being attached thereto in parallel to the attachment surface 26 by reducing a magnetic force applied to the electromagnetic chuck 61 or reducing a suction force applied to the vacuum chuck 62.

While the embodiments of the invention have been described above, the invention is not limited to the above-described embodiments, and can be embodied in other forms by appropriately applying modifications.

The invention claimed is:

1. A rotating axis supporting device comprising:
a housing;
a rotating axis including an elongated member rotatably pivoted to the housing;
a case for fixing the housing;
an adjustment mechanism for adjusting a position of the rotating axis by causing an attachment surface of the housing attached to the case to be perpendicular to an axial direction of the rotating axis, attaching the housing to move relative to the case in parallel to the attachment surface, and moving the housing and the case relative to each other in parallel to the attachment surface, wherein the adjustment mechanism includes:
a height direction adjustment hole and a corresponding height direction adjustment bolt oriented in a height direction perpendicular to the axial direction, and a depth direction adjustment hole and a corresponding depth direction adjustment bolt oriented in a depth direction transverse to the height direction and perpendicular to the axial direction;
an insertion hole in the housing; and
a fixing bolt having
a shank oriented in the axial direction and extending through the insertion hole,
a head at an end of the shank, and
a thread at another end of the shank, the thread engaged in a threaded hole in the case, wherein
in a firmly fixed state where the thread of the fixing bolt is fastened into the threaded hole, the head of the fixing bolt presses the housing against the case to fix the housing to the case, and
in a temporarily fixed state where the thread of the fixing bolt is loosened but remains engaged with the threaded hole, a gap between the shank of the fixing bolt and the insertion hole permits the housing to be movable relative to the case for adjustment by any of the height direction adjustment bolt and the depth direction adjustment bolt.

2. The rotating axis supporting device according to claim 1,
wherein, when the fixing bolt is in the temporarily fixed state, the height direction adjustment bolt and the depth direction adjustment bolt are configured to adjust the position of the rotating axis by moving the housing and the case relative to each other in parallel to the attachment surface by fastening or loosening the height direction adjustment bolt and the depth direction adjustment bolt.

3. The rotating axis supporting device according to claim 1, further comprising:
a height direction adjustment elastic body provided on a side opposing the height direction adjustment bolt in the case, wherein
when the height direction adjustment bolt is loosened, the housing is moved in a first direction by an elastic force of the height direction adjustment elastic body, and
when the height direction adjustment bolt is fastened, the housing is moved in a second direction opposite the first direction against the elastic force of the height direction adjustment elastic body.

4. The rotating axis supporting device according to claim 1, further comprising:
a depth direction adjustment elastic body provided on a side opposing the depth direction adjustment bolt in the case, wherein
when the depth direction adjustment bolt is loosened, the housing is moved in a first direction by an elastic force of the depth direction adjustment elastic body, and
when the depth direction adjustment bolt is fastened, the housing is moved in a second direction opposite the first direction against the elastic force of the depth direction adjustment elastic body.

5. A rotary table of a machine tool, comprising:
a jig plate having a workpiece installed thereon;
a rotary driving device rotating the jig plate;
a rotating axis supporting device provided at a position opposing the rotary driving device to support the jig plate; and
a base plate having the rotary driving device and the rotating axis supporting device placed thereon,
wherein the rotating axis supporting device comprises:
a housing;
a rotating axis including an elongated member rotatably pivoted to the housing;
a case for fixing the housing;
an adjustment mechanism for adjusting a position of the rotating axis by causing an attachment surface of the housing attached to the case to be perpendicular to an axial direction of the rotating axis, attaching the housing to move relative to the case in parallel to the attachment surface, and moving the housing and the case relative to each other in parallel to the attachment surface, wherein the adjustment mechanism includes:
a height direction adjustment hole and a corresponding height direction adjustment bolt oriented in a height direction perpendicular to the axial direction, and
a depth direction adjustment hole and a corresponding depth direction adjustment bolt oriented in a depth direction transverse to the height direction and perpendicular to the axial direction;
an insertion hole in the housing; and
a fixing bolt having
a shank oriented in the axial direction and extending through the insertion hole,
a head at an end of the shank, and
a thread at another end of the shank, the thread engaged in a threaded hole in the case, wherein
in a firmly fixed state where the thread of the fixing bolt is fastened into the threaded hole, the head of the fixing bolt presses the housing against the case to fix the housing to the case, and
in a temporarily fixed state where the thread of the fixing bolt is loosened but remains engaged with the threaded hole, a gap between the shank of the fixing bolt and the insertion hole permits the housing to be movable relative to the case for adjustment by any of the height direction adjustment bolt and the depth direction adjustment bolt.

* * * * *